May 13, 1969 M. L. SWAN 3,444,360
DIGITAL MULTIPLIER FOLLOWED BY A DIGITAL-TO-ANALOG CONVERTER
Filed July 12, 1965 Sheet 1 of 7

INVENTOR.
MERRILL L. SWAN
BY
*Fred G. Lawler*
ATTORNEY

INVENTOR.
MERRILL L. SWAN
BY
ATTORNEY

INVENTOR.
MERRILL L. SWAN

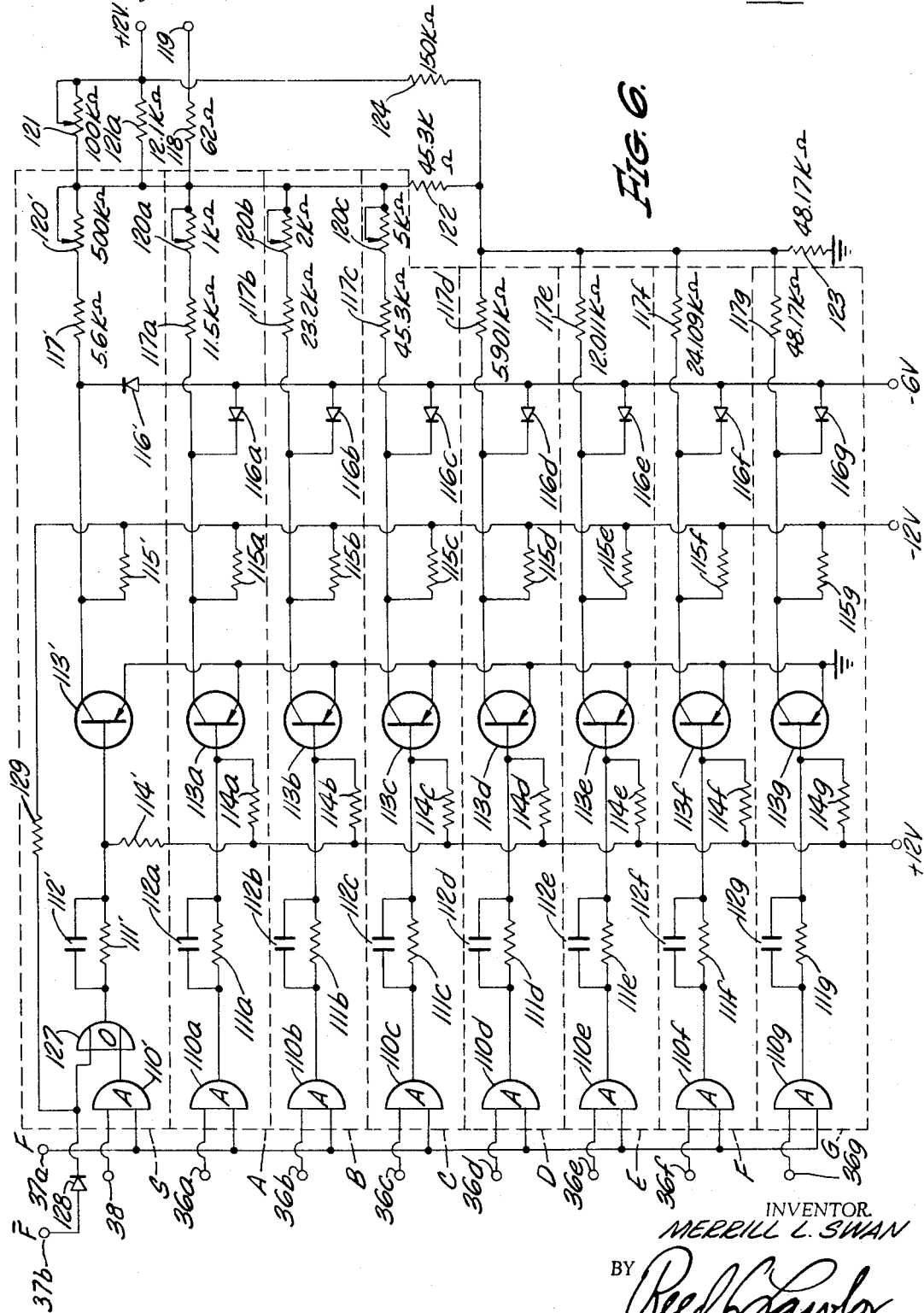

$(+1111111) \times (-1)$
$(-1111111) \times (+1)$ $(+1111111) \times (+1)$
$(-1111111) \times (-1)$

INVENTOR.
MERRILL L. SWAN (+1010010)x(+1)
(-1010010)x(-1)

(+1010010)x(-1)
(-1010010)x(+1)

INVENTOR.
MERRILL L. SWAN
BY Reed L. Lawlor
ATTORNEY

United States Patent Office 3,444,360
Patented May 13, 1969

3,444,360
DIGITAL MULTIPLIER FOLLOWED BY A DIGITAL-TO-ANALOG CONVERTER
Merrill L. Swan, Arcadia, Calif., assignor to United Geophysical Corporation, Pasadena, Calif., a corporation of Delaware
Filed July 12, 1965, Ser. No. 470,978
Int. Cl. G06f 7/39
U.S. Cl. 235—156                                    17 Claims

ABSTRACT OF THE DISCLOSURE

The multiplier of this invention produces an analog product of an analog multiplier and an analog multiplicand taking full account of the signs. The analog multiplier and multiplicand signals are converted to binary signals which are then multiplied together through the medium of special circuitry utilizing sign logic to multiply the numbers or their complements and to weight various intermediate products as explained to produce the final required output signal that presents the product both in magnitude and sign. The analog signals may be continuously variable functions of time.

---

This invention relates to a digital multiplier and digital-to-analog converter for obtaining in analog form the product of two digital numbers expressed in binary form, each number also having a sign digit representing the algebraic sign of the number. One of the particular features of the invention is that the algebraic signs of the two numbers being multiplied are carried through the multiplication process and, if the two signs are different, the output is in the form of a negative potential, whereas, if the two signs are alike, the output is in the form of a positive potential.

Multipliers which multiply together two digital numbers expressed in binary form as known in the art generally perform the multiplication process in a series of steps. Consequently, such multipliers are relatively slow and thus have an inherent disadvantage when used in processes such as correlating data. For example, if it is desired to multiply together two, 8-bit binary numbers (as in an auto-correlation or cross-correlation process), every few microseconds, a multiplier that performs the multiplication in a series of steps is quite unsuitable. Such an operation is required, in, for example, obtaining a correlation function between two seismograph traces which must be converted into digital form and then virtually instantaneously multiplied together as various time delays are successively introduced between the two traces. In such an application, it is often desired that the output of the multiplier be in analog form to provide a correlation between the two traces. In addition, each of the two traces being correlated has both positive and negative excursions about a reference line. Therefore, the output of the multiplier should reflect whether one trace is having a positive excursion while the other is having a negative excursion or whether both are having positive excursions or both are having negative excursions.

With reference to the foregoing example, it might be asked why, when two analog signals are to be multiplied together to produce an analog output, an analog multiplier is not used. The answer lies in the considerably greater accuracy of a digital multiplier. This accuracy is offset, however, by the complexity and/or slower speed of the digital multiplier. In most digital multipliers for multiplying two numbers together, for example, one number is generally stored and successively multiplied by each digit of the other. The results from each of these multiplication operations must be added. The multiplications in digital form are easily performed, but the additions must be accomplished either in serial steps with added delay for digits that must be carried, or in a single step involving a much greater amount of and more complex computing equipment.

Accordingly, a primary object of the present invention is to provide a digital multiplier and a digital-to-analog converter that provides both the high accuracy of a digital multiplier and the high speed of operation of an analog multiplier.

The foregoing objective is attained in the present invention in a system embodying two binary storage registers. One register receives and stores a multiplier in binary form, plus a bit representing the algebraic sign of the multiplier, and the second register receives and stores the multiplicand in binary form, plus a bit representing the algebraic sign of the multiplicand. The bits representing the signs of the two numbers are supplied to a sign computer, which compares the two bits and provides an indicative signal to sign logic circuitry if the two signs are not the same. The bits representing the number in the first storage register are also supplied to the sign logic circuitry. The outputs of the sign computer and the sign logic circuitry, along with the bits representing the number stored in the second register, are provided to a multiplying matrix.

The multiplying matrix comprises a number of channels equal in number to the number of bits supplied thereto from the second storage register. Each channel comprises a number of gates equal in number to the number of bits supplied thereto from the sign logic circuitry, plus the signal from the sign computer. The multiplying matrix serves to simultaneously multiply together the number supplied from the first storage register through the sign logic circuitry and the number supplied from the second storage register to provide an analog output, which represents the product of the two numbers and has a polarity which indicates the identity or non-identity of the algebraic signs of the two numbers. All of the output signals of the plurality of channels in the multiplying matrix are added together in a manner to indicate the significance of the various digits in the numbers and to have a polarity controlled by the algebraic signs of the two numbers. The analog output signal is provided virtually instantaneously as soon as two binary numbers are provided to the storage registers and yet has accuracy characteristic of digital multiplication.

The invention together with further features and objects thereof will be better understood from the following description, taken in conjunction with the accompanying drawings, in which.

Figure 4:
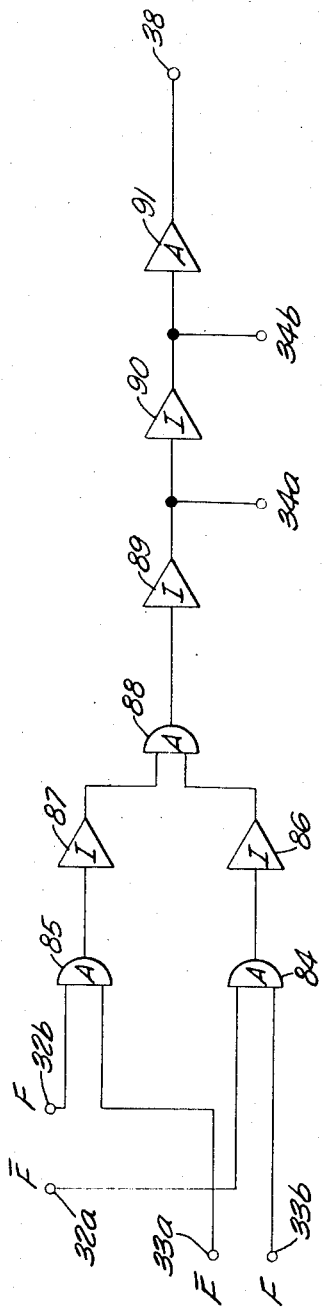
Figure 3A:
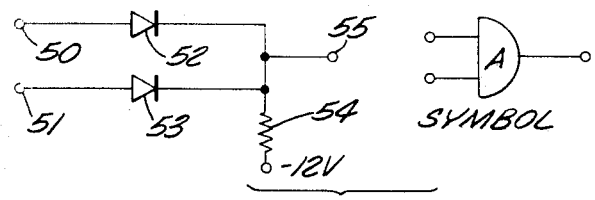
Figure 3B:
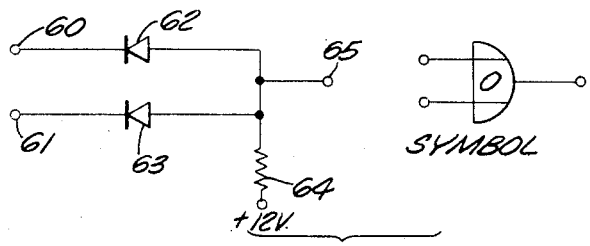
Figure 3C:
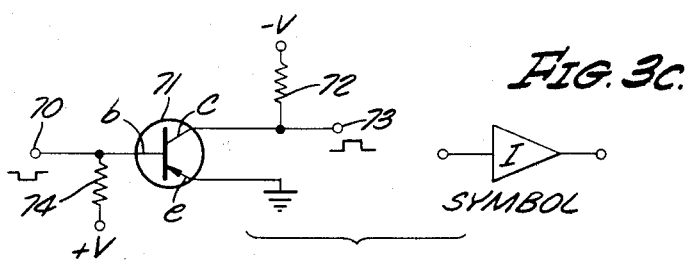
Figure 5:
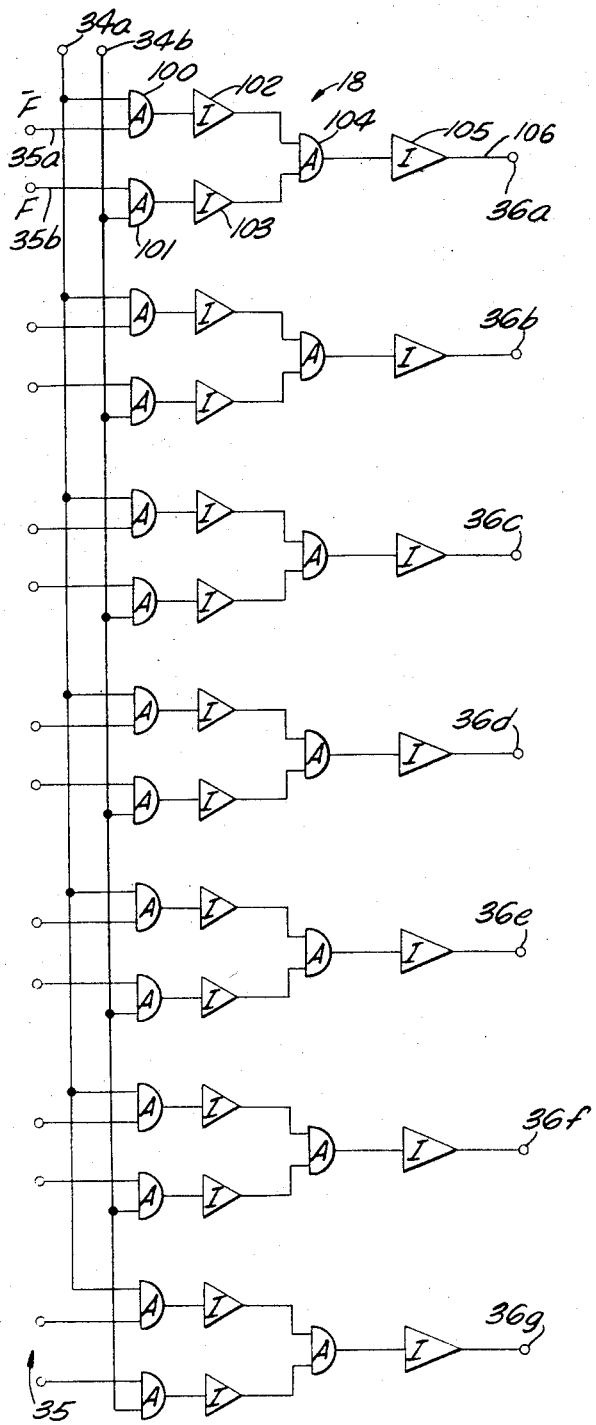
Figure 7:
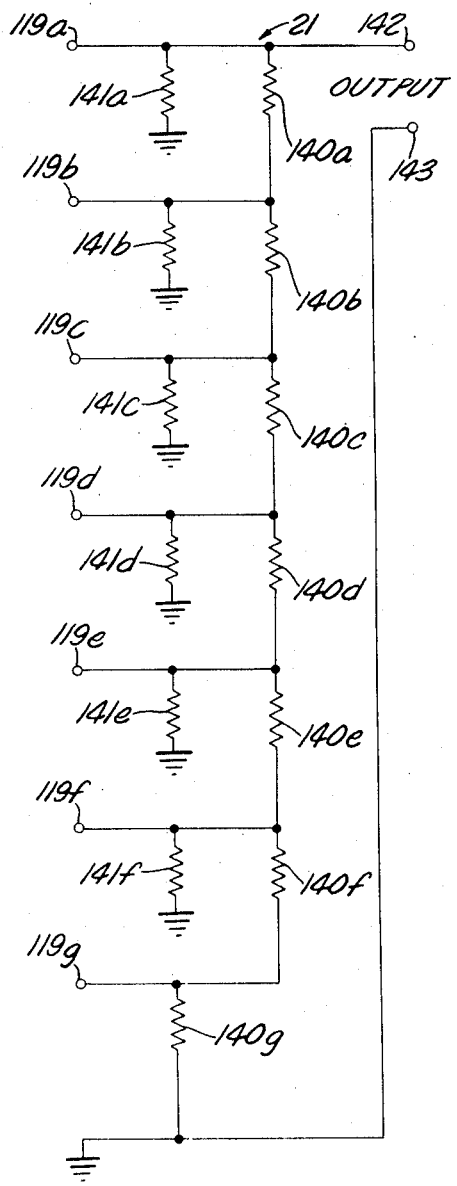
Figure 8A:
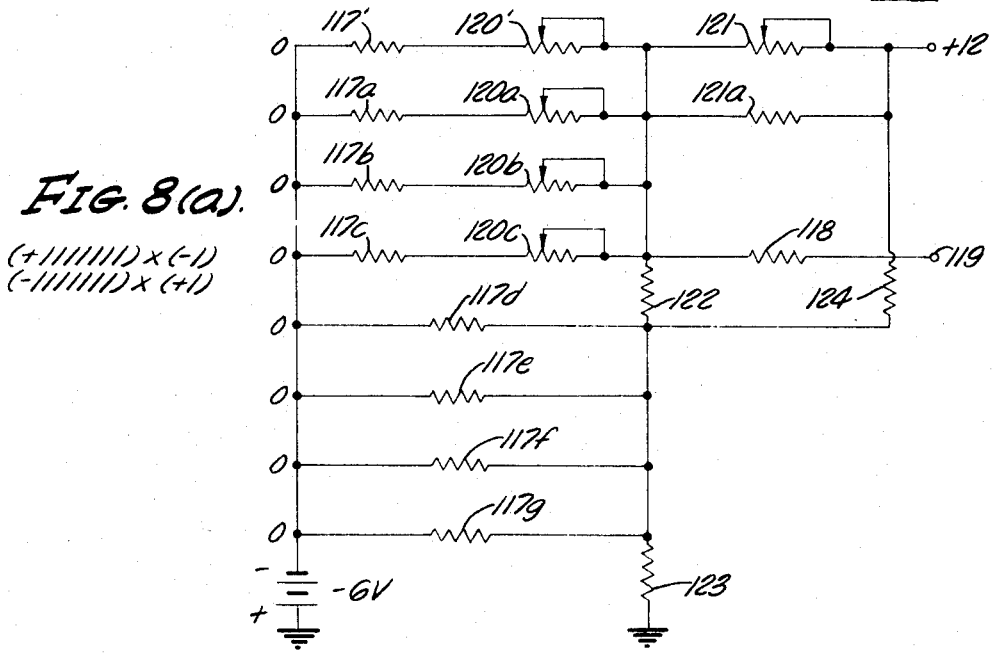
Figure 8B:
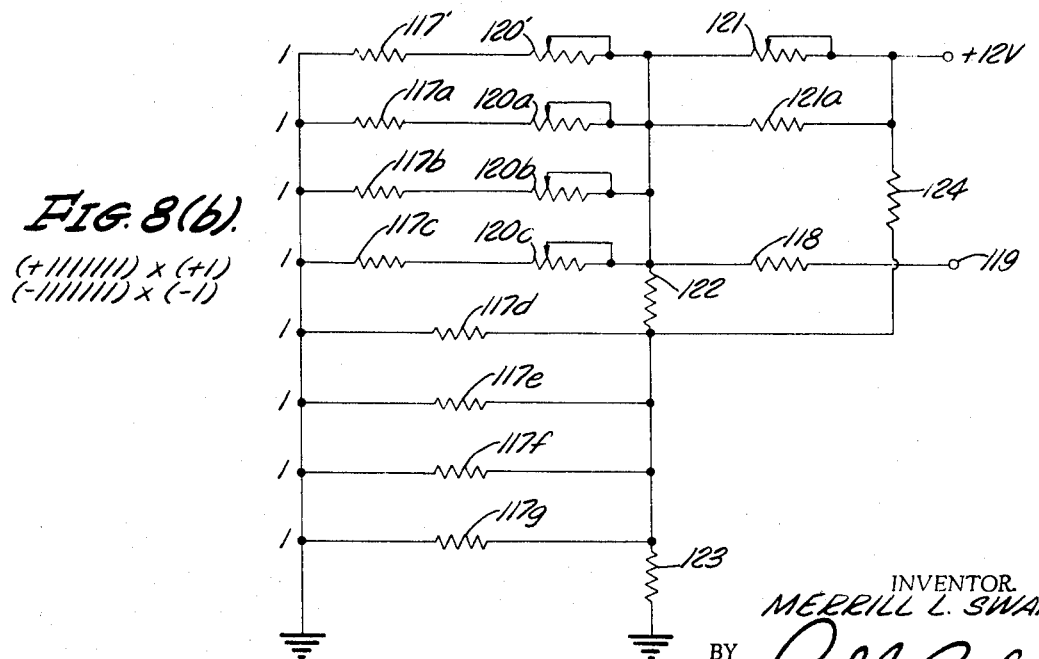
Figure 8C:
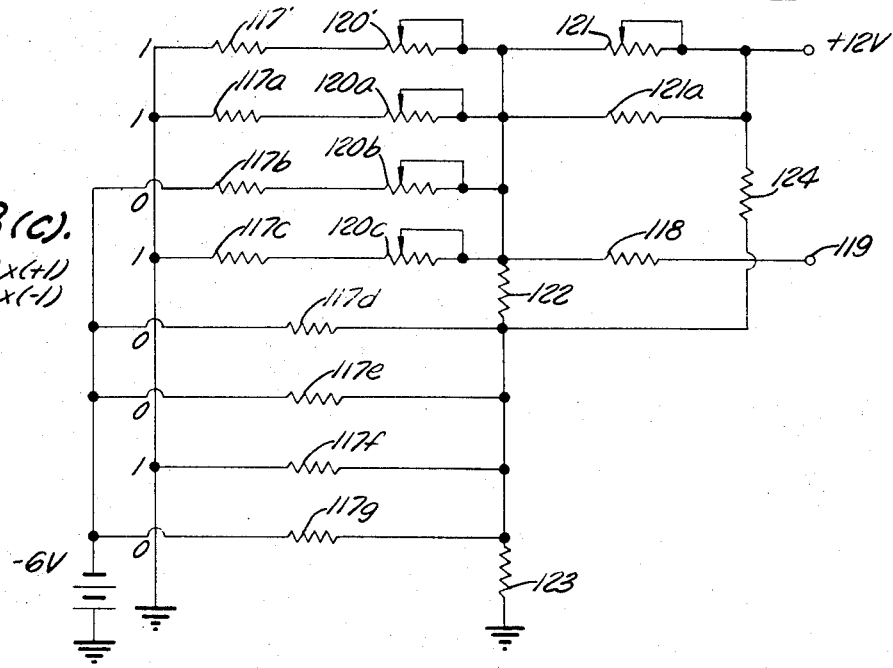
Figure 8D:
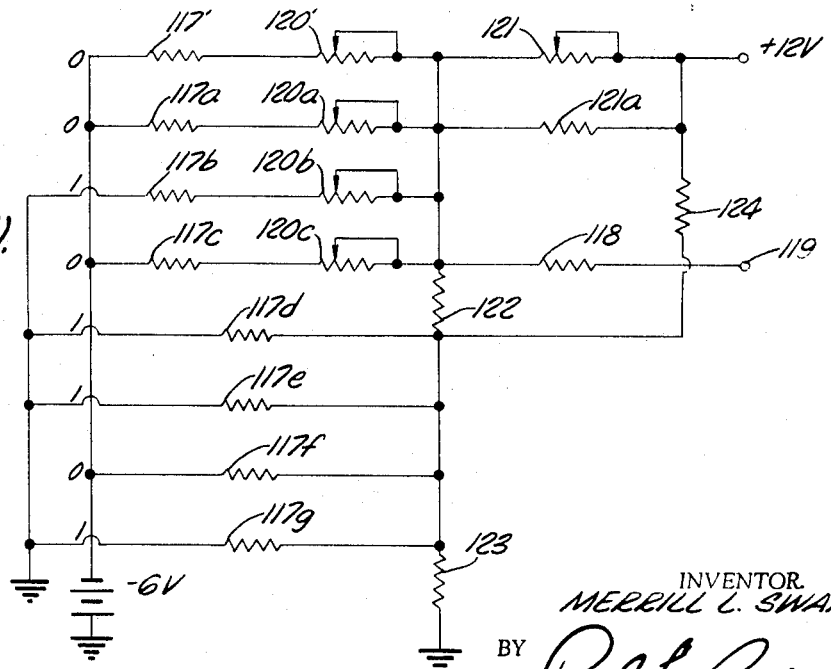
Figure 9:
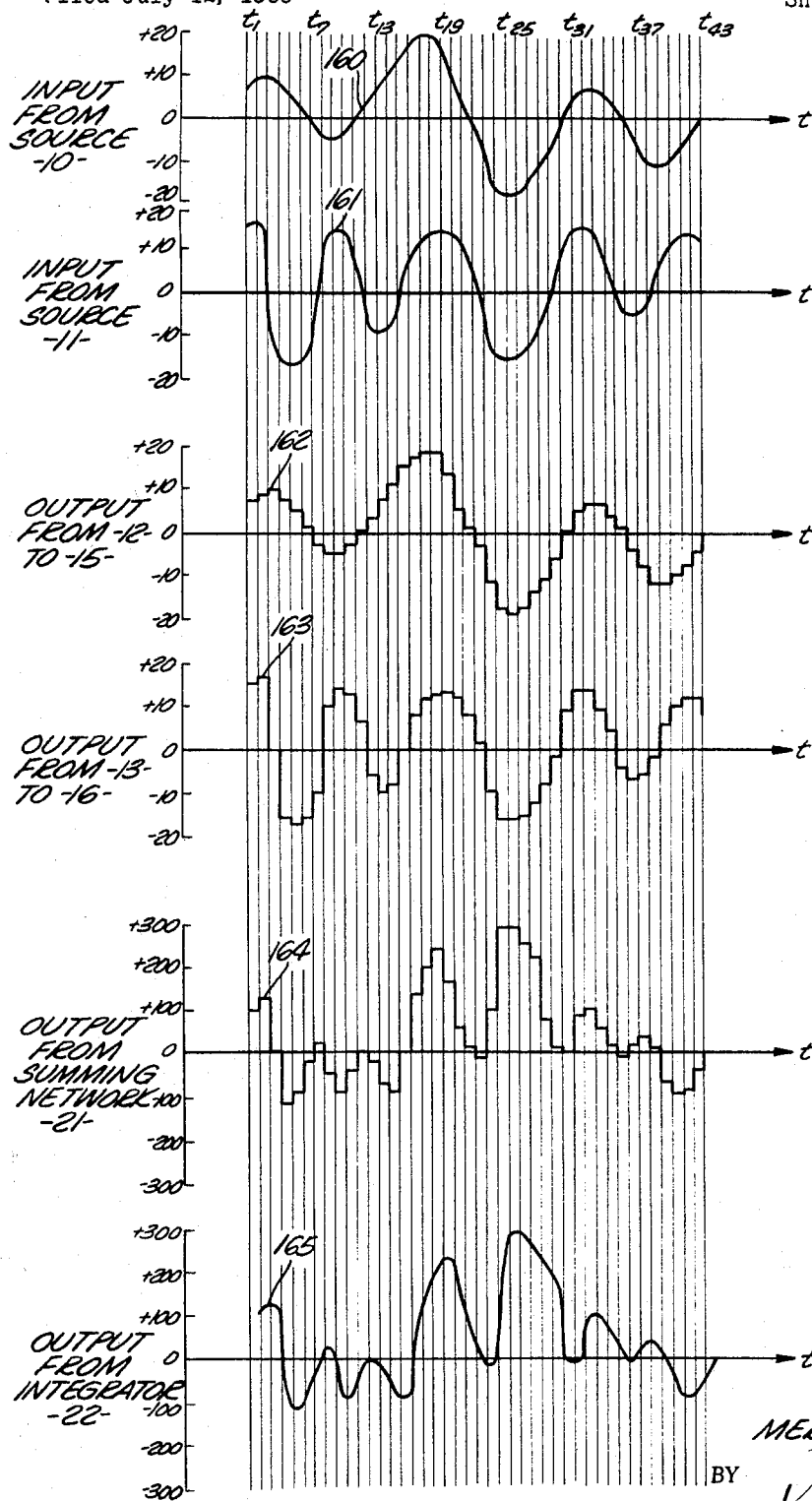

FIGS. 3a, 3b, and 3c, are respectively diagrams of an AND gate, an OR gate, and an inverter used in the circuitry of the invention;

FIG. 4 is a logic diagram of the sign computer embodied in the circuitry of the invention;

FIG. 5 is a logic diagram of the sign logic circuitry utilized in the system of the invention;

FIG. 6 is a circuit diagram of one representative channel of the multiplying matrix embodied in the invention;

FIG. 7 is a circuit diagram of a summing network suitable for use in the system of the invention;

FIGS. 8(a)–8(d) are simplified equivalent circuit diagrams useful in understanding the operation of the multiplying matrix; and FIG. 9 is a set of waveforms illustrating the overall operation of a system embodying the invention.

Figure 1:
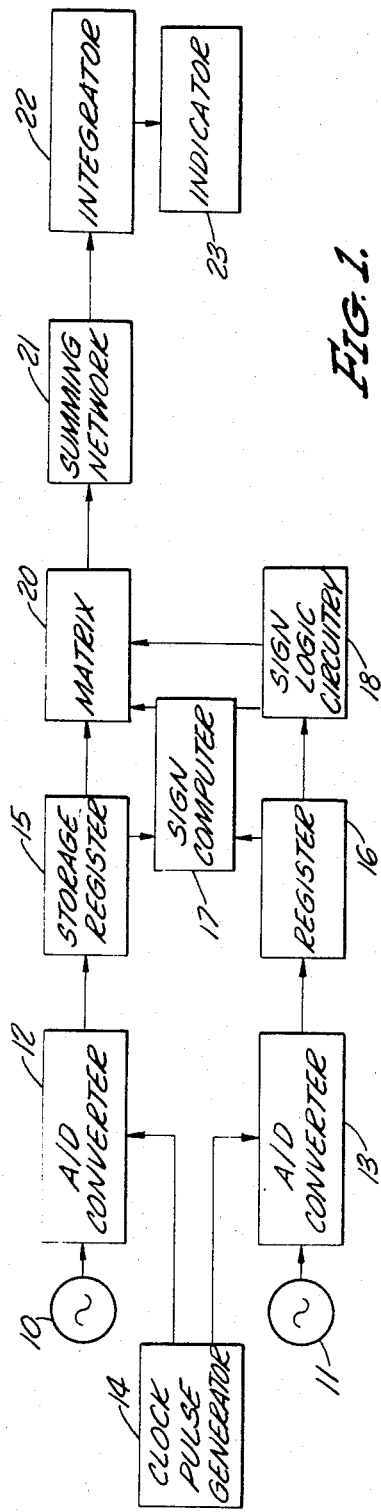
FIGURE 1 is a block diagram of a typical system embodying the invention.

FIG. 1 illustrates in block diagram form a typical system embodying the digital multiplier and digital-to-analog converter of the present invention. As shown, analog signals, which are to be multiplied together are provided from sources 10 and 11. It is assumed that the input analog signals provided from the sources 10 and 11 vary as a function of time and that they have both positive and negative excursions about a reference, or zero, level. For convenience, a signal supplied from source 10 is called a multiplicand signal and the signal supplied by source 11 is called a multiplier signal. In accordance with this invention the two simultaneously existing values of the input analog signals are multiplied together and the product is concurrently indicated together with the sign of the product, and the products of successively occurring pairs of values of the two analog signals are successively indicated in the output together with the successive signs of the product. More particularly, the products are in the form of electric signals that depart from a zero or other unique base value by amounts proportional to the absolute values of the products and with polarities corresponding to the signs of the products. Positive products are represented by electrical signals of one polarity and negative products are indicated by signals of the opposite polarity.

The signals supplied from the sources 10 and 11 are respectively supplied to analog-to-digital converters 12 and 13. The converters 12 and 13 function to convert the analog signals supplied from the sources 10 and 11 to digital signals indicative of the amplitudes of the analog signals at times determined by the receipt of clock pulses from a clock pulse generator 14. The output signals from the converters 12 and 13 are in binary form and comprise a sufficient number of bits to indicate the amplitudes of the analog input signals thereto. In addition, each converter 12 and 13 provides an output bit indicative of the polarity of the analog input signal. A suitable analog-to-digital computer for performing this function is known as the Model OC–2011 and is manufactured by Towson Laboratories, Inc., Towson, Md.

The output signals from the analog-to-digital converters 12 and 13 are respectively supplied to binary storage registers 15 and 16 which store the signals while they are being multiplied together. The storage registers 15 and 16 are conventional and may comprise a number of flip-flops equal to the number of bits in the signals received. Such registers are well known in the art, one being described in a book entitled, "Digital Computer Principles" by Burroughs Corporation, published by McGraw-Hill Book Company, 1962, Library of Congress Catalog No. TK7888.3.B85.

The two bits representing the algebraic signs of the two numbers stored in registers 15 and 16 are supplied to a sign computer 17, which serves to provide an output signal indicative of whether the two signs are alike or different. The output signal from the sign computer is provided to sign logic circuitry 18 along with signals representing the number stored in the register 16.

The sign logic circuitry 18, in response to a signal from the sign computer 17 indicating that the algebraic signs of the numbers stored in the registers 15 and 16 are different, causes the numbers stored in the register 16 to be complemented, for a reason which will be explained hereinafter in detail.

By complement is meant the numerical amount that must be added to a number to give the least number containing one more digit, that is to give the "base." For example, in decimal form, the complement of "4" is "6." In binary form, the complement of "1101001," for example, is "0010110."

The output signals from the sign logic circuitry 18, representing either the number stored in the register 16 or its complement, are provided to a multiplying matrix 20 along with signals representing the number stored in the register 15. The multiplying matrix 20 multiplies together the two sets of binary signals supplied thereto and supplies an output signal proportional to their product and having a polarity determined by whether the signals multiplied together have the same algebraic signs or have different algebraic signs. The output signals from the various channels in the multiplying matrix 20 are supplied to a summing network 21, which properly weights the signals in accordance with the significance of the digits represented by the signals. By "significance" is meant the position of the digit in the product number.

Since the signals stored in the registers 15 and 16 are not continuously variable, but change from one value to another at discrete time intervals, the output of the summing network 21 is in the form of a stepped signal. To produce a smooth continuously variable output signal when one or both of the input signals is varying, the output of the summing network 21 is supplied to an integrator 22 of conventional design. The output of the integrator 22 is then connected to energize a utilization device such as an indicator 23, which may be a recorder, a cathode ray tube, a computer, or other desired indicating device.

Figure 2:
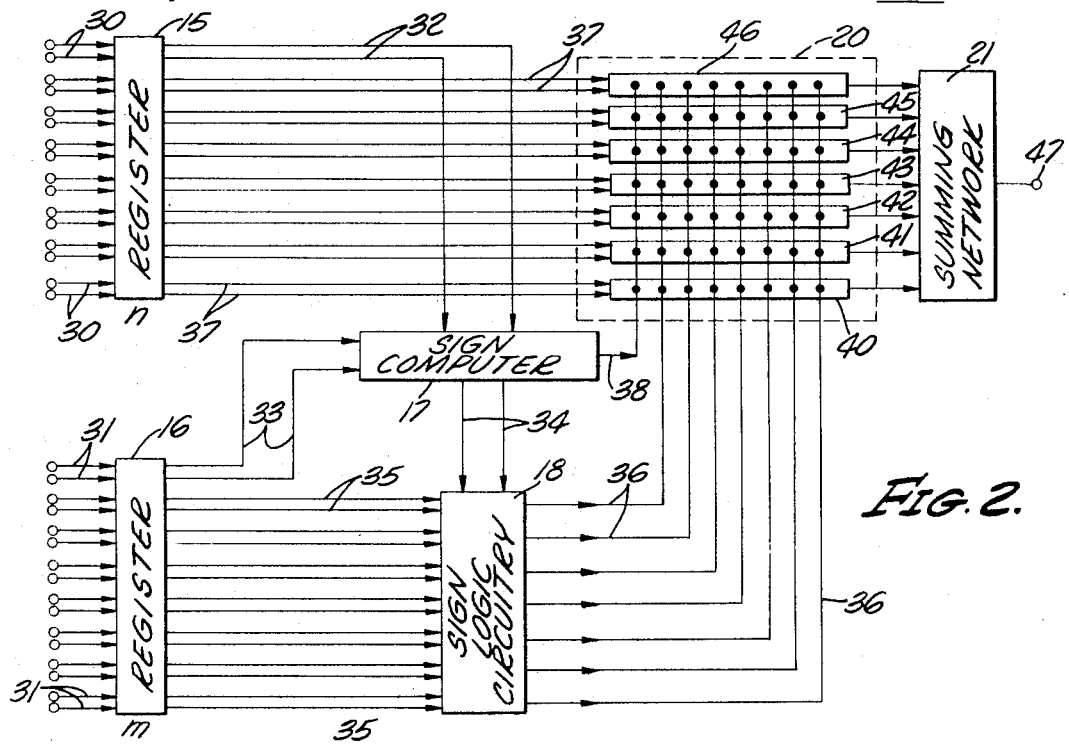
FIGURE 2 is a more detailed block diagram of a portion of the system shown in FIG. 1.

FIG. 2 is a block diagram showing a portion of the system shown in FIG. 1 in greater detail. Signals from the analog-to-digital converter 12 shown in FIG. 1 are provided to a plurality of input terminals 30 for the storage register 15. Similarly, signals are supplied from the analog-to-digital converter 13 to input terminals 31 for storage register 16. It is pointed out that, in this particular application, a signal and its complement are supplied to the registers 15 and 16 for each binary bit developed by the analog-to-digital converters. In other applications, the complementary bits could be generated in the registers themselves. The registers 15 and 16 serve to store the signals supplied from the analog-to-digital converters while the multiplication process is occurring continuously, signals are supplied from the analog-to-digital converters only at regular intervals as determined by the frequency of the clock pulses provided to the converters 12 and 13 from the clock pulse generator 14 (FIG. 1).

The first sign signal and its complement stored in the register 15 are continuously supplied to the sign computer 17 on leads 32, and the second sign signal and its complement stored in register 16 are similarly supplied on leads 33. The sign computer 17 serves to compare the signals supplied thereto and to provide a third sign signal and its complement on leads 34 to the sign logic circuitry 18. The binary signals and their complements representing the numbers stored in register 16 are also continuously supplied to the sign logic circuitry 18 on leads 35.

The sign logic circuitry 18, in response to the signals received from the sign computer 17, provides on output leads 36 binary signals representing either the binary number stored in the register 16 or else its complement. If the algebraic signs of the numbers stored in the registers 15 and 16 are the same, signals representing the numbers stored in register 16 are provided on the output leads 36 from the sign logic circuitry. On the other hand, if the signs of the numbers stored in registers 15 and 16 are different, signals representing the complement of the number stored in the register 16 are provided on the leads 36 from the sign logic circuitry. The signals on the leads 36 are continuously supplied to the multiplying matrix 20. Binary signals representing the numbers stored in register 15 and their complements are also continuously supplied to the multiplying matrix 20 on leads 37, simultaneously with the signals from the sign logic circuitry on leads 36 from the sign logic circuitry 18. The third sign signal is also supplied to the matrix 20 on lead 38.

As indicated in FIG. 2, and other figures to be hereinafter described, the numbers stored in registers 15 and 16 consist of seven bits and a sign bit, the sign bit being the most significant bit of each stored number. It is understood, of course, that the invention is in no way restricted to multiplying binary numbers of any particular number of bits. Also, the numbers of bits in the two numbers may not be the same, although they have been so shown for purposes of illustration only.

Because the number stored in the register 15 consists of seven bits ($n$ bits), the multiplying network 20 comprises seven ($n$) separate gating channels ($n$ channels) 40, 41, 42, 43, 44, 45, 46 of gating circuits, each channel of which receives a different bit and its complement from the register 15. The signals from the outputs of the sign logic circuitry 18 ($m$ outputs) are supplied to all seven of the channels in the multiplying matrix on the leads 36, and a signal from the sign computer 17 is similarly supplied to all seven channels on a lead 38. Each of the $n$ channels 40–46 comprises ($m+1$) gating circuits. Thus, it is seen that at any one time channel 40 serves to multiply the number (multiplier) supplied thereto on the leads 36 by the least significant digit of the number supplied thereto from the storage register 15. Similarly, at that same time, channel 41 serves to multiply the number supplied from the sign logic circuitry 18 by the next to the least significant digit of the number (multiplicand) stored in the register 15, and so on until channel 46 multiplies the number from the sign logic circuitry by the most significant digit (except for the sign digit) of the number stored in register 15. Thus the output of channel 40 represents the digit corresponding to $2^0$ or one, the output of channel 41 represents the multiplicand digit corresponding to $2^1$ or two, the output of channel 42 represents the multiplicand digit corresponding to $2^2$ or four, the output of channel 43 represents the multiplicand digit corresponding to $2^3$ or eight, the output of channel 44 represents the multiplicand digit corresponding to $2^4$ or sixteen, the output of channel 45 represents the multiplicand digit corresponding to $2^5$ or thirty-two, and the output of channel 46 represents the multiplicand digit corresponding to $2^6$ or sixty-four.

Each of the gating channels 40–46 comprises ($m+1$) gating circuits (to be later explained in detail), and successive gating circuits of each channel correspond to digits of successive significance of the multiplier signal and the third sign signal. Each of the gating circuits has two inputs, with the first inputs of all of the gating circuits in each respective channel being connected together and to a different one of the $n$ inputs from the register 15. The second inputs of $n$ gating circuits that correspond to each particular digit of the multiplier signal are connected together to form $m$ sets of gating circuits, the respective sets of gating circuits corresponding to the respective digits being separately connected to the $m$ outputs of the sign logic circuitry 18. The second inputs of the remaining gating circuits are connected together and connected to receive the third sign signal.

The output signals of the multiplying channels 40–46 are supplied to the summing network 21. The summing network 21 adds together all of the signals received from the multiplying matrix 20 and weights them in accordance with the significance of the digit that they represent. Thus, the output from the multiplier channel 40 might be assigned a weight of one unit to correspond to the least significant bit in the $2^0$ position; channel 41, a weight of two units to correspond to the second least significant bit in the $2^1$ position; channel 42, a weight of four units to correspond to the third significant bit in the $2^2$ position; channel 43, a weight of eight units to correspond to the fourth least significant bit in the $2^3$ position; channel 44, a weight of 16 units to correspond to the fifth least significant bit in the $2^4$ position; channel 45, a weight of 32 units to correspond to the sixth least significant bit in the $2^5$ position; and channel 46, a weight of 64 units to correspond to the most significant bit (seventh) in the $2^6$ position. The summed output signals are provided on an output terminal 47 from the summing network 21.

Summarizing briefly, the multiplier and digital-to-analog converter of the invention receives two digital signals representing two numbers to be multiplied together, each of which includes a signal representing the algebraic sign of the number. The two numerical signals and their respective sign signals are respectively stored in two storage registers. The sign signals are supplied to a sign computer, which determines the identity or non-identity of the two algebraic signs. The numerical signals from one of the storage registers are supplied to sign logic circuitry along with signals from the sign computer indicating the identity or non-identity of the two signs. If the two algebraic signs are different, the sign logic circuitry provides at its output the complement of the numerical signal supplied to it; if the algebraic signs are the same, the output of the sign logic circuitry represents the numerical signal supplied to the circuitry.

The numerical signals from that register which are not supplied to the sign logic circuitry and the output signals from the sign logic circuitry are supplied to a multiplying matrix, which simultaneously multiplies together the two sets of signals and also weights the output signals in accordance with the significance of the various digits in the numbers. If the algebraic signs of the two numbers being multiplied together are the same, the output of the matrix is positive in polarity; if the signs are different, the output is negative.

The output signals from the multiplying matrix are summed in a summing network to provide an analog output signal which is proportional in amplitude to the product of the two digital input signals and whose polarity indicates the identity or non-identity of the algebraic signs of the digital numbers. Since the digital input numbers change periodically rather than continuously, an integrator or other suitable filtering network may be utilized to produce a smooth continuously variable analog output signal to energize an indicator.

Before proceeding with a detailed description of the logic circuitry and the multiplying matrix, it is believed desirable to consider the fundamental gating and inverting circuits involved in the logic circuitry. In the present case, the signals supplied to such circuitry are either at substantially ground potential or at substantially $-10$ volts, and all of the negative signals are of substantially the same amplitude. Specifically, a binary "0" is defined as a zero volt signal, and a binary "1" is defined as a $-10$ volt signal.

FIG. 3a shows a typical AND circuit suitable for use in the circuitry of the invention. Input terminals 50 and 51 receiving two negative-going input signals are connected to the anodes of diodes 52 and 53, respectively. The cathodes of diodes 52 and 53 are connected together and to one end of a resistor 54 whose other end is connected to a source of $-12$ volts DC. An output terminal 55 is also connected to the cathodes of the diodes 52 and 53. So long as the signal supplied to either of the terminals 50 and 51 is at ground potential, current will flow through one of the diodes 52 or 53 and the output terminal 55 will be substantially at ground potential. However, if equal negative signals are supplied simultaneously to both terminals 50 and 51, the potential at the output terminal 55 will be substantially equal to the negative potentials supplied to the input terminals 50 and 51.

FIG. 3b illustrates a typical OR circuit such as might be used in the circuitry of the invention. A pair of input terminals 60 and 61 for receiving negative-going signals are connected to the cathodes of diodes 62 and 63 respectively. The anodes of the diodes 62 and 63 are connected together and to one end of a resistor 64, the other end of which is connected to a source of +12 volts D.C. An output terminal 65 is also connected to the anodes of the diodes 62 and 63. In operation, if the signal at either of the input terminals 60 or 61 is at ground potential, current flows from the +12 volt source through the resistor 64 and the output terminal 65 is at approximately ground potential. If now a negative input signal is supplied to at least one of the input terminals 60 or 61, increased current will flow through the resistor 64 and the output terminal will be approximately at the voltage level of the input signal. In the present case, the input signals supplied to the terminals 60 and 61 are either at ground potential or at −10 volts. Therefore, the voltage at the output terminal 65 varies between approximately ground potential and approximately −10 volts.

FIG. 3c illustrates a typical inverter circuit that might be used in the circuitry of the invention. As shown, an input terminal 70 is connected to the base $b$ of a PNP type transistor 71, whose emitter $e$ is grounded. The collector $c$ of the transistor 71 is connected through a resistor 72 to a source of negative voltage −V and to an output terminal 73. The base of the transistor 71 is also connected through a resistor 74 to a source of positive potential +V. In operation, when a zero-voltage input signal is applied to the terminal 70, the transistor 71 is biased to cutoff by the positive potential on its base and the output terminal 73 is at a negative potential equal to that applied to the collector of the transistor. When a negative voltage of sufficient amplitude to overcome the positive bias applied to the base of the transistor is supplied to the terminal 70, the transistor is driven into saturation and the output terminal 73 rises to approximately ground potential. Thus, a negative-going input signal is inverted to provide a positive-going output signal.

It will be understood that the foregoing examples of AND, OR and inverter circuits are presented as illustrative only, and that various other conventional well-known circuits may be used in their stead. It was previously stated in connection with the description of FIGS. 3a–3c, that the signals applied to the input terminals of those circuits are either zero volts or −10 volts. Those are the basic logic levels utilized in the system of the invention and will be adhered to hereinafter.

In order to understand more readily the logic circuitry to be hereinafter explained, it is first necessary to consider the particular binary code used throughout the system. As previously mentioned, for purposes of illustration, an 8-bit code has been chosen in which seven bits represent a number and the eighth, the most significant bit, represents the algebraic sign of the number. In the particular code utilized, if the sign bit is a binary "1," the algebraic sign of the number is negative, whereas, if the sign bit is a "0," the algebraic sign of the number is positive. The following Table I shows illustrative values of the binary code and corresponding decimal numbers:

TABLE I
(Binary-Decimal Code)

| Binary | Decimal |
| --- | --- |
| 1 1 1 1 1 1 1 1 | −127 |
| 1 0 1 1 1 1 1 1 | −63 |
| ⋮ | ⋮ |
| 1 0 0 0 0 0 1 1 | −3 |
| 1 0 0 0 0 0 0 1 | −1 |
| 1 0 0 0 0 0 0 0 | 0 |
| 0 0 0 0 0 0 0 0 | 0 |
| 0 0 0 0 0 0 0 1 | +1 |
| 0 0 0 0 0 0 1 1 | +3 |
| ⋮ | ⋮ |
| 0 1 1 1 1 1 1 1 | +127 |

FIG. 4 illustrates the logic circuitry of the sign computer 17 previously mentioned. A pair of input terminals 32a and 32b are supplied on leads 32 (FIG. 2) with the complement F of the sign bit and the sign bit F from the register 15, and another pair of input terminals 33a and 33b are similarly supplied on lines 33 with the complement F of the sign bit and the sign bit F from the register 16. Input terminals 32a and 33b are connected to the input of an AND gate 84 and terminals 32b and 33a are similarly connected to an AND gate 85. The outputs of the AND gates 84 and 85 are respectively connected to the inputs of inverters 86 and 87 whose outputs are connected to another AND gate 88. The output of AND gate 88 is connected to the input of an inverter 89 whose output is connected to the input of another inverter 90. The output of the inverter 90 is connected to the input of a conventional, non-inverting amplifier 91 whose output is connected to an output line 38 (also see FIG. 2). An output terminal 34a is connected between the inverter 89 and 90 and an output terminal 34b is connected between the inverter 90 and the amplifier 91 (see FIG. 2). Each combination of an AND gate followed by an inverter constitutes a NAND gate.

The sign computer shown in FIG. 4 provides a "0" signal on terminal 34a if the algebraic signs of the two numbers being multiplied are the same, but a "1" signal on terminal 34a if the algebraic signs of the two numbers are different. Of course, terminals 38 and 34b will have signals thereon that are complementary to that appearing on terminal 34a.

To facilitate understanding of the operation of the circuit, consider the case in which the algebraic signs of the two numbers are both negative so that terminals 32b and 33b have "1" signals thereon and terminals 32a and 33a have "0" signals thereon. Thus, under these conditions, AND gate 84 receives a "0" signal and a "1" signal, and AND gate 85 also receives a "0" signal and a "1" signal. Consequently, there are "0" output signals from both gates. These signals are inverted by the inverters 86 and 87 to provide two "1" signals to the input of AND gate 88 which will therefore produce a "1" output signal. This output signal is inverted by the inverter 89 to provide a "0" output signal on terminal 34a and "1" output signals on terminals 38 and 34b to indicate that the algebraic signs of the two numbers are the same.

If the algebraic sign of the number stored in the register 15 is positive and the sign of the number stored in the register 16 is negative, terminals 32a and 33b would have "1" signals thereon and terminals 32b and 33a have "0" signals thereon. In that situation, "1" signals would be supplied to the input of AND gate 84, and "0" signals would be supplied to the AND gate 85. Therefore the output of AND gate 84 would be a "1" signal and the output of AND gate 85 would be a "0" signal. After inversion, these signals would be applied to the AND gate 88 which would produce a "0" output signal. After inversion by the inverter 89, a "1" signal would appear on the terminal 34a and "0" signals would appear on terminals 34b and 38, thus indicating that the algebraic signs of the numbers are different.

If the sign of the number stored in the register 15 is negative and the sign of the number in the register 16 is positive, the situation is reversed from that just described. That is, the terminals 32a and 33b would receive "0" signals, and the terminals 32b and 33a would receive "1" signals. Thus, the output of the AND gate 84 would be a "0" signal, the output of the AND gate 85 would be a "1" signal, and the output of the AND gate 88 would be a "0" signal. The output signal of the AND gate 88 is inverted to provide a "1" signal on the terminal 34a and is again inverted to provide "0" signals on terminals 34b and 38.

If the signs of the numbers stored in the registers 15 and 16 are both positive, "0" signals will be provided to terminals 32b and 33b, and "1" signals will be provided to terminals 32a and 33a. Therefore, the outputs of the AND gates 84 and 85 will both be "0" signals, which, after inversion, cause the AND gate 88 to provide a "1" output signal. This signal is inverted to provide a "0" signal on terminal 34a and is once more inverted to provide "1" signals on terminals 34b and 38.

The following Table II is a so-called "truth table," which shows the various output signals from the gates 84, 85, 88 and the signals provided to terminals 38, 34a, 34b, as a result of various combinations of input signals applied to terminals 32a, 32b, 33a, 33b:

TABLE II
Sign computer

| | Input | | | | Output | | | | | |
|---|---|---|---|---|---|---|---|---|---|---|
| | 32a | 32b | 33a | 33b | 84 | 85 | 88 | 38 | 34a | 34b |
| (1) | 1 | 0 | 0 | 1 | 1 | 0 | 0 | 0 | 1 | 1 |
| (2) | 0 | 1 | 0 | 1 | 0 | 0 | 1 | 1 | 0 | 1 |
| (3) | 0 | 1 | 1 | 0 | 0 | 1 | 0 | 0 | 1 | 0 |
| (4) | 1 | 0 | 1 | 0 | 0 | 0 | 1 | 1 | 0 | 0 |

The signals present on the terminals 34a and 34b are supplied to the sign logic circuitry 18, shown in block form in FIGS. 1 and 2 and in logical diagram form in FIG. 5. The sign logic circuitry 18 comprises a number $m$ of identical channels, the number $m$ being equal to the number of bits, excluding the sign bit, of the number stored in the register 16. Thus, in the present case, the sign logic circuitry 18 comprises seven identical channels. Because the channels are identical, only one will be described.

Each channel comprises a pair of AND gates 100 and 101, whose outputs are respectively connected to inverters 102 and 103 as shown in the upper part of FIG. 5. Thus, AND gate 100 and inverter 102 form a NAND gate, as do AND gate 101 and inverter 103. The outputs of the inverters 102 and 103 are connected to the input of an AND gate 104, whose output is connected to an inverter 105, the output of which is connected to an output terminal 106. For convenience, the output terminals are designated 36a–36g in order of descending digit significance to correspond to the leads shown in FIG. 2. The inputs to the AND gate 100 are from the terminal 34a of the sign computer and from the complementary bit $\bar{F}$ of the most significant digit of the number stored in the register 16 supplied to terminal 35a. The inputs to the AND gate 101 are from the terminal 34b of the sign computer and from the bit F of the most significant digit stored in the register 16 supplied to terminal 35b. The function of each of the channels of the sign logic circuitry is to provide on the output terminals 106 the complement of the number stored in the register 16, if there is a "1" present on terminal 34a from the sign computer, which indicates that the algebraic signs of the numbers stored in the two registers 15 and 16 are different. The complementing of one of the stored numbers, as explained in more detail hereinafter with reference to the multiplying matrix shown in FIG. 6, makes it possible to produce an output signal having a polarity dependent on the sign of the product.

In looking at the operation of the sign logic circuitry shown in FIG. 5, assume first that "0" and "1" signals are present on terminals 34a and 34b, respectively. This indicates that the number stored in the register 16 is not to be complemented, because the signs of the numbers stored in the two registers 15 and 16 are the same. Assume also that input terminals 35a and 35b connected to the register 16 hace "0" and "1" signals, respeutively, thereon, which are the complement $\bar{F}$ of the bit representing the digit stored and the bit F representing the stored digit. In that case, the input to the AND gate 100 will have two "0" signals supplied to it to produce a "0" output signal, and the input to the AND gate 101 will have two "1" signals to produce a "1" output signal. After inversion, these signals are applied to the AND gate 104 which produce a "0" output signal. That signal is inverted and appears on the output terminal 36a as a "1," which corresponds to the "1" on input terminal 35b.

Assume now that output terminals 34a and 34b have "0" and "1" signals, respectively, thereon, and terminals 35a and 35b have "1" and "0" signals, thereon. In that case, the output signals from the AND gates 100 and 101 will both be "0," which, when inverted, produce a "1" output signal from AND gate 104, which is inverted to provide a "0" output signal on output terminal 36a. This signal is the same as that present on input terminal 35b.

If now the input signals on input terminals 34a and 34b are "1" and "0," respectively, the output signal appearing on terminal 36a will be the complement of that appearing on input terminal 35b. For example, if the signals on terminals 35a and 35b are "0" and "1," respectively, the output signals from the AND gates 100 and 101 are both "0." Thus, the output signal from the AND gate 104 is a "1," which is inverted to provide a "0" signal on terminal 36a. This is the complement of the "1" input signal appearing on terminal 35b.

In the situation where the signals on the terminals 34a and 34b are respectively "1" and "0" and the signals on the terminals 35a and 35b are respectively "1" and "0," the output signal from the AND gate will be a "1" and the output signal from the AND gate 101 will be "0." This will produce a "0" signal from gate 104, which provides a "1" signal on output terminal 36a.

The following Table III is a truth table indicating the signals appearing throughout the circuit in response to various combinations of input signals:

TABLE III
(Sign Logic Circuitry)

| Input | | | | Output | | | |
|---|---|---|---|---|---|---|---|
| 34a | 34b | 35a | 35b | 100 | 101 | 104 | 36a |
| 0 | 1 | 0 | 1 | 0 | 1 | 0 | 1 |
| 0 | 1 | 1 | 0 | 0 | 0 | 1 | 0 |
| 1 | 0 | 0 | 1 | 0 | 0 | 1 | 0 |
| 1 | 0 | 1 | 0 | 1 | 0 | 0 | 1 |

As previously mentioned, the multiplying matrix 20 comprises a plurality of identical channels, one of which is shown in FIG. 6. The number of channels is equal to the number of bits $(n)$, except for the sign bit, of the number stored in the register 15. Only one of those numerical channels will be described in detail.

Referring to FIG. 6, it is seen that the channel there shown comprises a plurality $(m+1)$ of gating circuits designated A, B, C, D, E, F, and G which, with the exception of a gating circuit (designated "S") for the sign bit, are virtually identical so far as circuit arrangement is concerned. As will be pointed out hereinafter, and as shown in the figure, the values of the circuit components for the various gating circuits (hereinafter called "gates") differ from each other in certain cases. It is seen that the gates A–G comprise AND gates 110a–110g, one input of each gate 110a–110g being respectively connected to an output line 36a–36g from the sign logic circuitry (FIG. 5). The other input to each gate 110a–110g is from a bit F supplied on terminal 37a from the storage register 15. The gate outputs are respectively connected through resistors 111a–111g, respectively, in parallel with capacitors 112a–112g, to the bases of PNP transistors 113a–113g. The bases of the transistors 113a–113g are also respectively connected to a source of +12 volts DC through resistors 114a–114g. The resistors 111 may have values of 4.7K ohms, and the capacitors 112, 10 micromicro-farads. The emitters of the transistors are grounded and their collectors are respectively connected through resistors 115a–115g to a source of −12 volts DC, and through diodes 116a–116g to a source of −6 volts DC. The resistors 115 have values of 47K ohms. The diodes 116 are so poled that current flows from the −6 volt source to the −12 volt source and, when a transistor 113 is cut off, the collector of the transistor is maintained at approximately −6 volts.

The collectors of the transistors 113a–113c are respectively connected through precision resistors 117a–117c, through potentiometers 120a–120c (connected as variable resistors), and through another precision resistor 118 to an output terminal 119. A potential source of +12 volts DC is connected through a potentiometer 121 (connected as a variable resistor) and parallel fixed resistor 121a to the juncture of the potentiometers 120a–120c. One end of each of the potentiometers 120a–120c, which ends are also connected to the resistor 118, is connected to one end of a resistor 122, whose other end is connected through a resistor 123 to ground. The +12 volt source is also connected through a resistor 124 to the juncture of the resistors 122 and 123. The collectors of the transistors 113d–113g are connected through precision resistors 117d–117g, respectively, to the juncture of resistors 122 and 123.

The sign gate S, which is shown uppermost in FIG. 6, is similar to the other gates except for its inputs. The sign gate comprises an AND gate 110' whose two inputs are respectively connected to terminal 38 on which the sign signal appears and to the terminal 37a on which the signal F representing the binary bit of the multiplier digit stored in the register 15 appears. The output of the AND gate 110' is connected as one input to an OR gate 127, whose second input is the complement $\overline{F}$ of the binary multiplier signal provided from the register 15 through a diode 128 from terminal 37b. The cathode of the diode 128, which is connected to the OR gate 127, is also connected to the source of −12 volts DC through a resistor 129 for biasing purposes. The output of the OR gate 127 is connected through a resistor 111', having a capacitor 112' connected in parallel therewith, to the base of a PNP transistor 113'. The base of the transistor 113' is also connected through a resistor 114' to the source of +12 volts DC. As in the case of the other gates previously discussed, the emitter of the transistor 113' is connected to ground, and the collector is connected to the source of −12 volts DC through a resistor 115' and to the source of −6 volts DC through a diode 116'. The collector of the transistor 113' is also connected to the juncture of the potentiometers 120a–120c through a serially connected resistor 117' and potentiometer 120', the latter being arranged as a variable resistance.

As previously mentioned, the collectors of the transistors 113 are maintained at −6 volts when the transistors are non-conductive. This occurs because of current flow from the −6 volt source through the diodes 116 and the resistors 115 to the −12 volt source. On the other hand, when the transistor is fully conducting, its collector is at essentially ground potential because its emitter is connected to ground through the transistor. Thus, the output from each of the gates may be either essentially at ground potential or negative, depending upon whether its transistor 113 is conducting in a saturation state or is cut off. In its normal state, with a zero input signal, each transistor 113 is cut off because of the +12 volt bias on its base. However, when a "1" signal is provided from the AND gate 110, the transistor goes into saturation and the potential on its collector rises essentially to ground. A "1" output signal will be provided from an AND gate 110 only when its multiplier and multiplicand input signals are both "1." Thus, as various ones of the transistors 113 are saturated or are cut off, various combinations of resistors are connected in parallel between the +12 volt supply and either zero potential or −6 volts. By properly choosing the values of the resistors, and exemplary values are shown in FIG. 6 (the potentiometers 120, 121 and 120a–120c serving as trimming resistors), the output of each of the gating circuits A–G can be weighted in accordance with the significance of the digit to which each gating circuit corresponds. Thus, the voltage appearing at the output terminal 119 accurately represents the product of the single multiplicand digit supplied to all of the AND gates 110 and the various digits of the multiplier supplied to terminals 36a–36g. The resistors 122 and 123, of course, serve as summing resistors to provide the signal to the output terminal 119.

It was previously mentioned that if the algebraic signs of the two numbers stored in registers 15 and 16 are different, the sign logic circuitry shown in FIG. 5 causes the complement of the number stored in the register 16 to be provided on the terminals 36a–36g. This is necessary so that the analog output signal from the matrix can be either positive or negative depending upon whether the algebraic signs of the two numbers are the same or are different. Whenever the number stored in the register 16 is complemented, a "0" appears on the terminal 38, which is one input to the sign gate.

What is considered now are several examples of different combinations of signals applied to the inputs of the sign gate. Bear in mind that the sign bit is the most significant bit of the number stored in the register 16. First assume that the signs of the numbers stored in the registers 15 and 16 are different. Therefore, a "0" signal will appear on the input terminal 38 to the sign gate. Assume further that a "1" bit is present from the register 15 on input terminal 37a, and hence a "0" bit is present on terminal 37b. In this case, the output of the AND gate 110' will be a "0" signal and the output of the OR gate 127 will be a "0" signal. Therefore, transistor 113' will remain cut off and its collector will remain at approximately −6 volts. This has the effect of subtracting from the algebraic sums of the signals developed by all of the other gates the signal developed by the sign gate, because of the very low resistance values of the resistor 117' and the potentiometer 120' connected between +12 and −6 volts. Inasmuch as the sign gate represents the most significant bit, the resultant output voltage on terminal 119 will be a negative voltage proportional to the number supplied on terminals 36a–36g multiplied by the bit supplied on terminal 37a. Under all other combinations of input signals, the output of the OR gate 127 will be a binary "1," which turns on the transistor 113' and maintains its collector at approximately ground potential. This, in effect, neutralizes the sign gate so that it adds no output to the algebraic sum of the outputs of the other gates. The following Table IV illustrates the various conditions for the possible combinations of input signals:

TABLE IV
(Gating circuit)

| Input | | | Output | | |
|---|---|---|---|---|---|
| 38 | 37a | 37b | 110' | 127 | Collector of 113' |
| 0 | 1 | 0 | 0 | 0 | −6v. |
| 0 | 0 | 1 | 0 | 1 | 0v.; |
| 1 | 1 | 0 | 1 | 1 | 0v |
| 1 | 0 | 1 | 0 | 1 | 0v. |

It is particularly pointed out that one of the inputs to the OR gate 127 is from terminal 37b. This is done so that if the signs of the numbers being multiplied are different and a zero is being supplied from the register 15 on terminal 37a, the collector of the transistor 113' will be at zero volts and there will be no output from the sign gate, which would otherwise be added to a zero output from the remaining numerical gates. The matrix may be calibrated by adjusting the potentiometers 120', 120a–120c and 121 for accuracy of output.

The following Table V illustrates in decimal form the action that takes place when one of two numbers having opposite signs is complemented, multiplied by the other, and the first number multiplied by the most significant possible digit and subtracted from this product. This, in effect, is what occurs in the gate matrix shown in FIG. 6, when numbers having different algebraic signs are multiplied together.

TABLE V $$3 \times -4 = (3 \times 6) - (3 \times 10) = -12$$
$$4 \times -6 = (4 \times 4) - (4 \times 10) = -24$$
$$9 \times -7 = (9 \times 3) - (9 \times 10) = -63$$

Let us look now at several simplified equivalent circuit diagrams of one channel of the matrix 20 under different input conditions. For example, assume that the number "1111111" is supplied from the register 16 and that the sign computer provides a "0" signal on its terminal 38 indicating that the signs of the two numbers stored in the registers 15 and 16 are different. Also, assume that "1" and "0" signals are provided on the terminals 37a and 37b, respectively, from the register 15. In that case, the sign logic circuitry 18 would cause the number "1111111" to be complemented so that "0000000" would be supplied to the matrix channel on leads 36. The channel would operate similarly to the simplified equivalent circuit shown in FIG. 8(a), wherein the same reference numerals have been used as in FIG. 6. Under the conditions described, all of the resistors 117′ and 117a–117g would be in effect connected to −6 volts and the maximum negative output signal would be provided on the terminal 119.

In another example, assume that the number "1111111" is supplied from the register 16 and that the sign computer supplies a "1" signal on terminal 38 indicating that the numbers stored in the registers 15 and 16 have identical algebraic signs. As in the last case considered, also assume that "1" and "0" signals are supplied on terminals 37a and 37b, respectively. In that case, all of the resistors 117′ and 117a–117g would be in effect connected to ground as shown in FIG. 8(b), and the maximum positive output signal would be provided on the terminal 119.

As another example, consider the case in which the number "1010010" is supplied from the register 16 and the sign computer supplies a "1" signal on terminal 38 to indicate that the algebraic signs of the numbers stored in the registers 15 and 16 are the same. Also, assume that "1" and "0" signals are supplied on the terminals 37a and 37b, respectively. In that case, as shown in FIG. 8(c), the resistors 117′, 117a, 117c, and 117f are in effect connected to ground, while the resistors 117b, 117d, 117e and 117g are in effect connected to −6 volts. Thus, the output signal on terminal 119 represents "1010010" times "1," or "82."

Finally, consider the situation in which the number "1010010" is supplied from the register 16 and the sign computer provides a "0" signal on terminal 38, thus indicating that the algebraic signs of the numbers stored in the registers 15 and 16 are different. Also, assume that "1" and "0" signals are supplied on terminals 37a and 37b, respectively. The sign logic circuitry 18 would cause the number "1010010" to be complemented so that "0101101" would be supplied to the matrix on leads 36. Thus, the situation is reversed from that shown in FIG. 8(c); the resistors 117′, 117a, 117c and 117f are connected to −6 v., and the resistors 117b, 117d, 117e, and 117g are connected to ground to provide a negative output signal rather than a positive one. It is noted that the output signals from the equivalent circuits of FIGS. 8(c) and 8(d) are of the same amplitude but of opposite polarity.

The outputs from all of the matrix channels 40–46 shown in block form in FIG. 2, one of which is shown in detail in FIG. 6, are summed in a summing network 21. A representative summing network is shown in FIG. 7. It is understood that the invention is not limited to the use of the particular network shown in FIG. 7, and it is shown and described as being merely an especially convenient network.

As shown in FIG. 7, the summing network comprises a plurality of resistors 140a–140g connected in series, between an input terminal 119a from the output of the gating matrix 46 of the most significant digit, and ground. Each of the resistors 140a–140f has a resistor 141a–141f, respectively, connected across it to ground. Output terminals from the remaining gating matrices 45–40 are respectively connected to the junctures of the resistors 141b and 140b, 141c and 140c, etc. This particular type of network is especially convenient to construct inasmuch as all the resistors may be of the same value, for example, 3000 ohms. Output terminal 142 is connected to the juncture of resistors 141a and 140a and an output terminal 143 is grounded.

Utilizing this type of summing network the output of the multiplying matrix channel that appears on terminal 119a will appear at output terminal 142 without any attenuation. The output of the channel that appears at terminal 119b will be divided, one half appearing across resistor 140a and one half across resistor 141a. Thus, the output voltage from that channel will be one half the voltage appearing on terminal 119b. In the same manner, one half of the next lower ranking matrix channel output appears at the summing resistor output of the next highest ranking channel. Using this type of the network, the output of N channels can be weighted so that the lowest ranking channel output is reduced by $2^N$.

The summing network shown in FIG. 7 weights the outputs of the various multiplifier matrix channels 40, 41, 42, 43, 44, 45, 46 in accordance with the significance of the bit of the multiplier supplied to them. Thus, the output signal appearing across output terminals 142 and 143 is proportional to the product of the numbers contained in the registers 15 and 16 and has a polarity which is positive if the algebraic signs of the two numbers are the same and negative if the signs of the two numbers differ.

Consider now that two binary numbers, for example, "1010101" and "1101010," are being multiplied together, and that the first number is stored in the register 15 and the second number is stored in the register 16. As previously explained, the channel 40 in the matrix 20 will provide the product of the number stored in the register 16 and the least significant digit of the number stored in the register 15. This product will be "1101010." Similarly, the output of channel 41 will be "0000000"; the outputs of channels 42, 44 and 46 will each be "1101010" and the outputs of channels 41, 43 and 45 will each be "0000000." After all of the outputs of the channels are summed and weighted by summing network 21, the resultant output will represent the following multiplication:

| 1101010<br>1010101 | Weighed outputs of<br>matrix channels |
|---|---|
| 1101010 | (Channel 40) |
| 0000000 | (Channel 41) |
| 1101010 | (Channel 42) |
| 0000000 | (Channel 43) |
| 1101010 | (Channel 44) |
| 0000000 | (Channel 45) |
| 1101010 | (Channel 46) |
| 10001100110010 | (Summing Network 21) |

It is believed that the operation of the multiplier and digital-to-analog converter is made sufficiently clear by the foregoing example that others need not be given.

In summarizing the overall operation of a system embodying the invention, reference is made to FIG. 9, taken in conjunction with FIG. 1. As shown in FIG. 9, two time-varying analog signals represented by the curves 160 and 161 are supplied from the sources 10 and 11 to the analog-to-digital converters 12 and 13, respectively. At times $t_1$–$t_{43}$, which times are determined by the frequency of the pulses produced by the clock pulse generator 14, digital signals represented by curves 162 and 163 are supplied to the storage registers 15 and 16. The digital signals stored in one of the registers, for example, the register 15, are complemented in the sign logic circuitry 18 if the algebraic signs of the stored numbers are different, and the output signals from the sign logic circuitry and from the register 15 are supplied to the multiplying matrix 20. The output of the multiplying matrix 20 is supplied to the summing network 21, whose output is a step-shaped analog signal such as is represented by the curve 164 in FIG. 9. This signal is smoothed by the integrator 22 to provide an analog signal such as is represented by the curve 165, which may be supplied to the indicator 23 or other utilization device.

It is now apparent that the multiplier and digital analog converter of the invention provides a device which combines the accuracy of a digital multiplier and the speed of an analog multiplier. It multiplies virtually instantaneously but with the extremely high accuracy characteristic of a digital multiplier. It is apparent that many changes and modifications may be made by one skilled in the art without departing from the spirit and scope of the invention.

The invention claimed is:
1. A digital multiplier for obtaining the product of a multiplier and a multiplicand in the form of digital numbers, each said number including a sign digit representing the algebraic sign of the number, comprising:
   ($m+1$) inputs for receiving a first composite signal comprising an $m$ digit multiplier signal and a first algebraic-sign digit signal and ($n+1$) inputs for receiving a second composite signal comprising an $n$ digit multiplicand signal and a second algebraic-sign digit signal;
   means connected to selected ones of said inputs to receive said first and second algebraic sign signals for providing a third sign signal;
   $n$ gating channels, each channel comprising ($m+1$) gating circuits, each gating circuit having a first gate input, a second gate input, and a gate output, the first gate inputs of all of said gating circuits in each respective channel being connected together and to a separate one of said $n$ inputs, successive gating circuits of each channel corresponding to digits of successive significance of said multiplier signal and to said third sign signal, the second gate inputs of $n$ gating circuits that correspond to each particular digit of the multiplier signal being connected together, thereby constituting $m$ sets of gating circuits, the respective sets of gating circuits corresponding to the respective digits of the multiplier being separately connected to the respective $m$ inputs, the second gate inputs of the remaining gating circuits being connected together and also being connected to receive said third sign signal; and
   a plurality of means within the respective gating channels for producing a weighted signal at the output of each of the ($m+1$) gating circuits, each said weighted signal being differently weighted in accordance with the significance of the digit to which said each gating circuit corresponds.

2. The apparatus defined by claim 1, wherein each said gating circuit selectively produces positive and negative polarity weighted output signals, and the outputs of said gating circuits are connected in parallel.

3. The apparatus defined by claim 2, wherein each said gating circuit includes a transistor which is selectively forced into saturation and cut off.

4. A digital multiplier for obtaining the product of a multiplier and a multiplicand in the form of digital numbers, each said number also having a sign digit representing the algebraic sign of the number, comprising:
   ($m+1$) inputs for receiving an $m$ digit multiplier signal and a first algebraic sign digit signal and ($n+1$) inputs for receiving an $n$ digit multiplicand signal and a second algebraic sign digit signal;
   logic means connected to one of said ($m+1$) inputs and to one of said ($n+1$) inputs to receive said first and second algebraic sign signals and to provide a third sign signal when said first and second algebraic signs are different;
   $m$ channels of sign logic circuitry, each channel having a first input, a second input, and an output, the first inputs of each channel being connected respectively to $m$ different ones of said ($m+1$) inputs, the second inputs of all channels being connected together and connected to receive said third sign signal for providing on $m$ outputs the complement of said multiplier signal in response to said third sign signal and adapted to provide said multiplier signal on said $m$ outputs in the absence of said third sign signal;
   $n$ gating channels, each gating channel comprising ($m+1$) gating circuits, each gating circuit having a first gate input, a second gate input, and a gate output, the first gate inputs of all of said gating circuits in each respective channel being connected together and to a separate one of said $n$ inputs, successive gating circuits of each gating channel corresponding to digits of successive significance of said multiplier signal and of said third sign signal, the second inputs of $n$ gating circuits that correspond to each particular digit of the multiplier signal being connected together, thereby constituting $m$ sets of gating circuits, the respective sets of gating circuits corresponding to the respective digits being separately connected to the respective $m$ outputs of said channels of sign logic circuitry, the second inputs of the remaining gating circuits being connected together and also being connected to receive said third sign signal; and
   means within each gating channel for producing a weighted signal at the output of each of the ($m+1$) gating circuits, each said weighted signal being differently weighted in accordance with the significance of the digit to which said each gating circuit corresponds.

5. The apparatus defined by claim 2, wherein each said gating circuit selectively produces positive and negative polarity weighted output signals, and the outputs of said gating circuits are connected in parallel.

6. The apparatus defined by claim 5, wherein each said gating circuit includes a transistor which is selectively forced into saturation and cut off.

7. A digital multiplier and digital-to-analog converter for obtaining the product of an $m$ digit multiplier number and an $n$ digit multiplicand number in analog form, each number also having a sign digit representing the algebraic sign of the number, comprising:
   a multiplier having ($m+1$) inputs for receiving an $m$ digit multiplier signal and a first algebraic sign digit signal and having ($n+1$) inputs for receiving an $n$ digit multiplicand signal and a second algebraic sign digit signal;
   means connected to selected ones of said inputs to receive said first and second algebraic sign signals and provide a third sign signal when said first and second algebraic signs are different;
   $n$ gating channels, each channel comprising ($m+1$) gating circuits, each gating circuit having a first gate input, a second gate input, and a gate output, the first gate inputs of all of said gating circuits in each respective gating channel being connected together and to $n$ inputs, successive gating circuits of each gating channel corresponding to digits of successive significance of said multiplier signal and of said third sign signal, the second inputs of $n$ gating circuits that correspond to each particular digit of the multiplier signal being connected together, thereby constituting $m$ sets of gating circuits, the respective sets of gating circuits corresponding to the respective digits being separately connected to the respective $m$ inputs, the second inputs of the remaining gating circuits being connected together and also being connected to receive said third sign signal;
   a plurality of means within the respective gating channels for producing a weighted signal at the output of each of the ($m+1$) gating circuits, each said weighted signal being differently weighted in accordance with the significance of the digit to which said each gating circuit corresponds; and
   common output means connected to combine the outputs of said channels of gating circuits and including means for weighting the output of each channel in accordance with the significance of the corresponding one of the $n$ multiplicand digits supplied to the channels.

8. The apparatus defined by claim 3, wherein each said gating circuit selectively produces positive and negative polarity weighted output signals, and the outputs of said gating circuits are connected in parallel.

9. The apparatus defined by claim 8, wherein each said gating circuit includes a transistor which is selectively forced into saturation and cut off.

10. A digital multiplier and digital-to-analog converter for obtaining in analog form the product of an $m$ digit multiplier number and an $n$ digit multiplicand number, each number also having a sign digit representing the algebraic sign of the number,
- a multiplier having $(m+1)$ inputs for receiving an $m$ digit multiplier signal and a first algebraic sign digit signal and having $(n+1)$ inputs for receiving an $n$ digit multiplicand signal and a second algebraic sign digit signal;
- logic means connected to one of said $(m+1)$ inputs and to one of said $(n+1)$ inputs to receive said first and second algebraic sign signals and provide a third sign signal when said first and second algebraic signs are different;
- $m$ channels of logic circuitry, each channel having a first input, a second input and an output, the first inputs of each channel being connected to $m$ different ones of said $(m+1)$ inputs, the second inputs of each said channel being connected together and connected to receive said third sign signal for providing on said outputs the complement of said multiplier signal in response to said third sign signal and adapted to provide said multiplier signal on said $m$ outputs in the absence of said third sign signal;
- $n$ gating channels, each channel comprising $(m+1)$ gating circuits, each gating circuit having a first gate input, a second gate input, and a gate output, the first gate inputs of all of said gating circuits in each respective gating channel being connected together and to a separate one of said $n$ inputs, successive gating circuits of each gating channel corresponding to digits of successive significance of said multiplier signal and to said third sign signal, the second gate inputs of $n$ gating circuits that correspond to each particular digit of the multiplier signal being connected together, thereby forming $m$ sets of gating circuits, the respective sets of gating circuits corresponding to the respective multiplier digits being separately connected to the respective $m$ outputs of said channels of sign logic circuitry, the second inputs of the remaining gating circuits being connected together and also being connected to receive said third sign signal;
- a plurality of means within the respective gating channels for producing a weighted signal at the output of each of the $(m+1)$ gating circuits, each said weighted signal being differently weighted in accordance with the significance of the multiplier digit to which said each gating circuit corresponds and for combining said weighted signals to produce a corresponding channel output; and
- common output means connected to combine the outputs of said gating channels of gating circuits and including means for weighting the output of each channel in accordance with the significance of the corresponding one of the $n$ multiplicand digits supplied to the channels.

11. The apparatus defined by claim 4, wherein each said gating circuit selectively produces positive and negative polarity weighted output signals, and the outputs of said gating circuits are connected in parallel.

12. The apparatus defined by claim 11, wherein each said gating circuit includes a transistor which is selectively forced into saturation and cut off.

13. In a digital multiplier for obtaining the product of two digital numbers, each said number also having a sign digit representing the algebraic sign of the number,
- $(m+1)$ inputs for receiving an $m$ digit multiplier signal and a first algebraic sign digit signal and $(n+1)$ inputs for receiving an $n$ digit multiplicand signal and a second algebraic sign digit signal;
- sign logic means connected to one of said $(m+1)$ inputs and to one of said $(n+1)$ inputs to receive said first and second algebraic sign signals and to provide a third sign signal when said first and second algebraic signs are different; and
- $m$ channels of sign logic circuitry, each channel having a first input, a second input, and an output, the first inputs of all said channels being separately connected to different ones of the remaining $m$ inputs of said $(m+1)$ inputs, the second inputs of all said channels being connected together and connected to receive said third sign signal for providing on said outputs the complement of said $m$ digit multiplier signal in response to said third sign signal.

14. The combination defined by claim 13, wherein the complement of said multiplier signal is provided on said outputs in response to the presence of said third sign signal, and the multiplier signal is provided on said outputs in the absence of said third sign signal.

15. The combination defined by claim 13, wherein said sign logic means comprises a plurality of NAND gates.

16. The combination defined by claim 13, wherein each said logic circuit comprises a plurality of NAND gates.

17. The combination defined by claim 13, wherein said sign logic means and each said logic circuit comprises a plurality of NAND gates.

References Cited

UNITED STATES PATENTS 3,327,103   6/1967   Bonnet     235—181

FOREIGN PATENTS 1,362,476   4/1964   France.
1,001,096   8/1965   Great Britain.

MALCOLM A. MORRISON, *Primary Examiner.*

DAVID H. MALZAHN, *Assistant Examiner.*

U.S. Cl. X.R.

235—150.52, 164, 181